United States Patent [19]

Budin et al.

[11] Patent Number: 4,634,825
[45] Date of Patent: Jan. 6, 1987

[54] APPARATUS FOR SCAVENGING THE EROSION ZONE OF SPARK-EROSIVE CUTTING PLANTS

[75] Inventors: Josef Budin, Minusio; Boris Sciaroni, Locarno; Beat Kilcher, Arcegno; Gideon Levy, Orselina, all of Switzerland

[73] Assignee: AG fur industrielle Elektronik AGIE Losone b. Locarno, Losone, Switzerland

[21] Appl. No.: 734,411

[22] Filed: May 14, 1985

[30] Foreign Application Priority Data

May 16, 1984 [CH] Switzerland ............... 2409/84

[51] Int. Cl.⁴ .................................. B23H 7/10
[52] U.S. Cl. ...................... 219/69 W; 204/206; 219/69 D
[58] Field of Search .......... 219/69 W, 69 D, 69 M; 204/129.6, 129.65, 206; 83/272, 273, 368

[56] References Cited

U.S. PATENT DOCUMENTS

| 3,928,163 | 12/1975 | Ullmann et al. | 219/69 W |
| 4,205,212 | 5/1980 | Ullmann et al. | 219/69 W |
| 4,263,493 | 4/1981 | Kilcher | 219/69 W |
| 4,495,393 | 1/1985 | Janicke | 219/69 W |
| 4,507,532 | 3/1985 | Inoue | 219/69 W |
| 4,527,035 | 7/1985 | Majestic | 219/69 W |
| 4,539,459 | 9/1985 | Yamagata | 219/69 W |
| 4,549,371 | 10/1985 | Hakoda | 51/273 |
| 4,564,431 | 1/1986 | Miyano | 219/69 W |
| 4,575,603 | 3/1986 | Inoue et al. | 219/69 W |

FOREIGN PATENT DOCUMENTS

| 157435 | 12/1980 | Japan | 219/69 W |
| 134134 | 10/1981 | Japan | 219/69 W |
| 58-59737 | 4/1983 | Japan | 219/69 D |
| 206321 | 12/1983 | Japan | 219/69 D |
| 169726 | 9/1984 | Japan | 219/69 D |
| 227333 | 12/1984 | Japan | 219/69 D |
| 526365 | 8/1972 | Switzerland . | |
| 2102323A | 2/1983 | United Kingdom | 204/129.6 |
| 91792 | 12/1949 | U.S.S.R. . | |

Primary Examiner—A. D. Pellinen
Assistant Examiner—Geoffrey S. Evans
Attorney, Agent, or Firm—Neuman, Williams, Anderson & Olson

[57] ABSTRACT

A scavenging chamber surrounds the electrode and is brought up to the erosion zone in the workpiece. A slide ring is fixed to the casing of the scavenging chamber and seals the latter with respect to the workpiece surface. The scavenging chamber is provided with a structure for adapting at least the casing portion carrying the slide ring to the slide ring orientation defined by the workpiece surface. Preferably the scavenging chamber is provided with controllable elements for defining the shape of the scavenging chamber casing, which elements can be in particular constructed as flexible annular diaphragms.

16 Claims, 9 Drawing Figures

APPARATUS FOR SCAVENGING THE EROSION ZONE OF SPARK-EROSIVE CUTTING PLANTS

BACKGROUND OF THE INVENTION

The present invention relates to an improvement in apparatus for scavenging the erosion zone in spark-erosive cutting plants that use a wire or strip-like electrode and a fluid scavenging medium.

In the case of spark-erosive cutting with wire or strip-like electrodes, the electrode is held between two guide heads and is guided by the latter. Particularly in the case of cutting at large angles, guide heads may be used which are oriented to the inclined position of the wire. An efficient scavenging of the erosion zone is particularly important in the case of large cutting angles because the working length of the wire in the workpiece is considerably increase. Increased guidance distances must be maintained, and the guidance distance may be further increased to avoid collision between pivotable wire guide heads and the work piece. It is therefore particularly important to maintain efficient scavenging. A suitable scavenging apparatus must also have characteristics permitting easy use for both conical and cylindrical cutting, as well as in the case of any recutting or shaving operations.

When spark-erosive cutting plants were introduced, generally the erosion zone was only scavenged by lateral jets of scavenging fluid. Practical experience with complex workpieces soon made it necessary to use more powerful scavenging means and they rapidly became widely used in the form of so-called coaxial scavenging, e.g. DE-OS No. 24 08 715. When conical cutting with moderate angular position was subsequently introduced, these scavenging approaches were largely retained, because the positioning of the guide heads for cylindrical cutting was generally retained. In order to further increase the scavenging action, there were then numerous improvements made. For example, the mouthpiece referenced in DE-OS No. 24 08 715 was given a special nozzle configuration according to DE-OS No. 28 09 506. In addition, the nozzle outlets were combined in a closed unit in the wire guide head, such as could also be used for the flow transfer to the workpiece.

It is a general disadvantage of all the aforementioned approaches that in the case of more pronounced conical cutting, there arises misalignment between the axis of the scavenging fluid and the axis of the wire electrode, due to the necessary distance between the jet outlet and the start of the cutting point—and the distance increases as the contour inclination angle increases. Thus, a larger cross-section of the coaxial jet strikes the workpiece surface on one side of the wire and is displaced in one direction. As a result, the flow of the scavenging fluid is increased, leading to the drawing in of air, which is then also drawn into the work zone. Attempts to prevent such air disturbances through the use of larger coaxial flow cross-sections or by working in a fluid bath are technically unsatisfactory solutions, because apart from the greater fluid consumption and the widely distributed secondary electrolysis, these approaches are also prejudicial with respect to idle times and splashing or spray protection. Splashing or spray protection measures became particularly necessary when increasing the scavenging of the erosion zone through the use of higher scavenging pressures, as when scavenging is done in one direction through the workpiece by supplying scavenging fluid under pressure on one side of the workpiece and removing the fluid on the other side of the workpiece by suction as described in DE-OS No. 28 33 765.

According to a further proposal (JP-OS No. 56-114628), the outlet of the coaxial scavenging nozzle can be oriented in accordance with the sloping position of the wire and positioned under numerical control by modification of the cutting vector. Although, compared with the first-described solutions, a certain improvement is obtained with regard to the quality of the erosion zone at considerable additional expenditure, the disadvantage still exists that the scavenging jet issuing in sloping manner on the wire inlet to the workpiece is once again deflected to one side, so that the risk of sucking in air sill exists.

A further proposal known from WO No. 80/02395, as is explained hereinafter relative to FIG. 1, provides oriented guide heads which are suspended on gimbals on supporting arms. Nozzle outlets for the scavenging fluid are provided on the guide heads, and the guide heads are positioned to direct a scavenging jet to the work zone. However, this approach fails to remove the difficulties of the described approaches with fixed scavenging heads in that there again, it is easier for the fluid to escape from the scavenging flow at the obtuse-angled impact point to the scavenging jet at the inlet point for wire on the workpiece than on the opposite, acute-angled side. The flow takes the path of least resistance, in that the larger quantity flows out of the abtuse-angled side, which leads to vacuum effects and the drawing in of air on the acute-angled side. Further, it is apparent that by use of the oriented guide heads, relatively large contour slope angles can be cut, but there is an increased cutting length in the workpiece and there is an increased distance betwen the guide means and the workpiece.

SUMMARY OF THE INVENTION

The problem addressed by the present invention is to eliminte the aforementioned disadvantages of the prior art and to ensure an undisturbed scavenging flow in the work zone. According to the invention this problem is solved by providing a scavenging chamber surrounding the wire or strip-like electrode and leading to the erosion zone in the workpiece. The invention is particularly useful in spark-erosive plants wherein the wire guides are controlled to be oriented in the direction of the wire electrode during angle cutting. The scavenging chamber is sealed against the surface of the workpiece by a slide ring, thereby minimizing splashing and fluid loss and minimizing the drawing in of air to the erosion zone, yet not interfering with the machining operation. The walls of the scavenging chamber are constructed of a flexible material to permit the slide ring to seat on the workpiece even when the wire guide is at an angle to the surface of the workpiece. The scavenging chamber walls may include a plurality of individual chambers or pockets spaced around the circumference of the scavenging chamber, to which pockets a pressurized or low pressure medium may be selectively applied in order to more positively shape the scavenging chamber walls. The scavenging chamber preferably includes an annular chamber surrounding the scavenging nozzle through which a core scavenging jet and the wire electrode exit, which annular chamber is supplied with scavenging fluid to ensure complete flushing of the erosion zone and to prevent the entrainment of air in the scavenging flow.

As a result of this construction, the scavenging flow can be brought close to the workpiece. The entry of air can be prevented through scavenging chambers which are adaptable to the sloping position. Simultaneously, a cicumferential scavenging jet is formed, which makes it possible to concentrate the core scavenging jet to the dimensions of the cutting zone and consequently make it more efficient.

BRIEF DESCRIPTION OF THE DRAWINGS

The invention is described in greater detail hereinafter relative to illustrative embodiments and the attached drawings, which show.

DETAILED DESCRIPTION OF THE PREFERRED EMBODIMENTS

Figure 1:
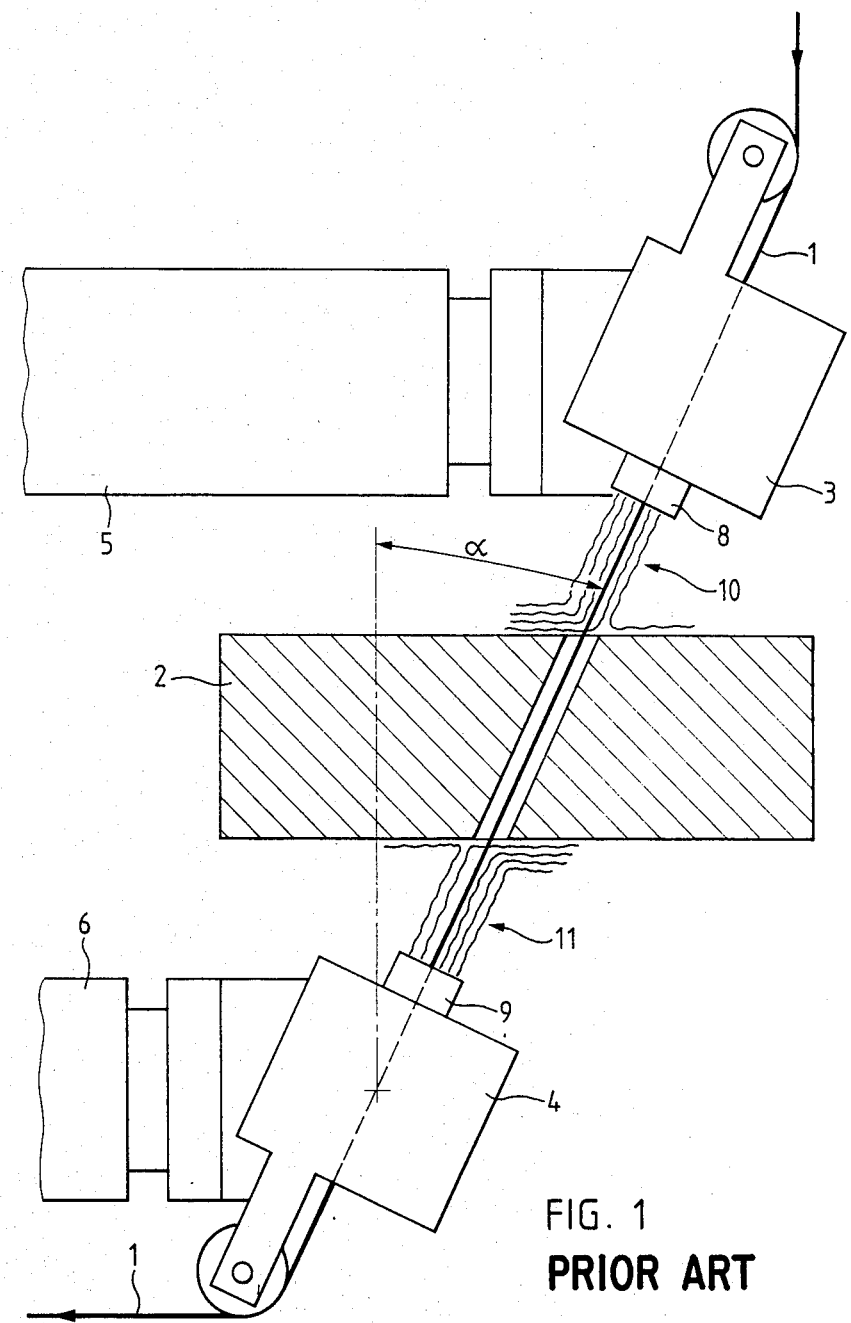
FIG. 1 a construction according to the prior art.

According to FIG. 1, showing a prior art approach, a wire electrode 1 having a slope angle $\alpha$ with respect to workpiece 2 is given a cutting vector or direction perpendicular to the plane of the view depicted. Oriented guide heads 3, 4 are used and are suspended on gimbals of supporting arms 5, 6 of the spark-erosion plant. Nozzle outlets 8, 9 are provided on the oriented guide heads 3, 4, from which a scavenging jet 10, 11 passes to the erosion zone.

Figure 2:
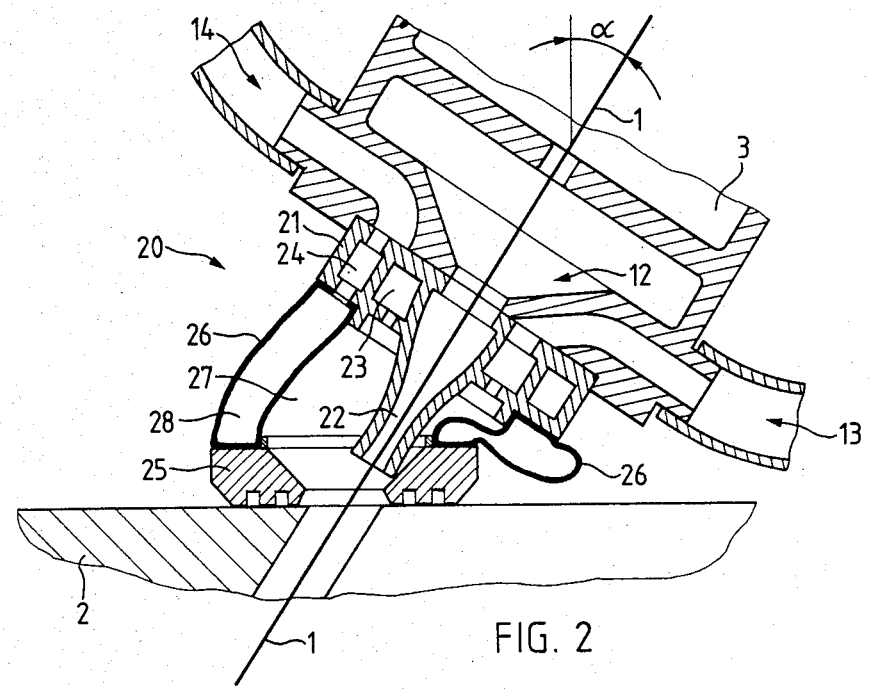
FIG. 2 a cross-sectional view of one embodiment of the present invention.

FIG. 2 shows in a cutaway from the workpiece 2, the upper guide head 3 and preferred scavenging apparatus 20 in accordance with the present invention. The wire electrode 1 is in section, corresponding to the contour slope angle $\alpha$. The same arrangement can be used on the bottom of workpiece 2 and consequently it is not shown. The side of the guide head 3 facing the workpiece 2 is equipped with three scavenging fluid connections 12, 13, 14, the hose connection for scavenging connection 12 not being located in the plane of the drawing and consequently not shown. The operating procedure for the apparatus with said scavenging connections 12, 13, 14 follows after the description of the construction of the scavenging apparatus 20.

The scavenging system 20 can be frontally connected to guide head 3, so that the different scavenging connections 12, 13, 14 cooperate with scavenging system 20. The latter comprises a scavenging nozzle member 21, in which two additional annular chambers 23, 24 are arranged coaxially around the central coaxial scavenging nozzle 22. A slide ring 25 rests flat on the surface of workpiece 2 and consequently at an angle to particular sloping position of gude head 3, in accordance with the contour slope angle $\alpha$. The slide ring has various annular grooves in the front bearing surface, and in said grooves the working medium acts as a slide assisting lubricant. The slide ring 25 is made from a material which, in addition to being wear resistant, has good sliding charateristics on metal surfaces. This slide ring has a conical inner bore surface, which is contacted by the scavenging nozzle 22 to advance the slide ring 25 during machining. Slide ring 25 is connected by means of a flexible annular sleeve 26 to scavenging system 20, said sleeve tightly sealing an annular chamber 27 around the coaxial scavenging nozzle 22. The annular sleeve 26 is also constructed in the form of an annular chamber 28, which is connected through annular chamber 24 to the scavenging connection 14. Annular chamber 28 of annular sleeve 26 can also be peripherally subdivided into a plurality of individual chambers by partitions, it then being necessary to arrange a correspondingly larger number of scavenging connections 14a . . . n on guide head 3.

In practical use, the complete scavenging system 20 provides a constant connection between the guide head 3 and the inlet point of the scavenging jet and the wire electrode 1 in the erosion zone of workpiece 2 and in accordance with any sloping position, can adapt to a contour slope angle $\alpha$ through flexible annular sleeve 26. By means of the scavenging connection or connections 14, pressure medium can be applied to the annular chamber or chambers 28 in annular sleeve 26 in such a way that the sloping position of guide head 3 relative to the workpiece is ensured. If necessary, it is possible to use a vacuum instead of a pressurized medium. It has proved advantageous for use in the case of large-angle working operations to peripherally subdivided angular chamber 28 into numerous individual chambers, so that the sloping position of slide ring 25 relative to guide head 3 can be controlled by appropriately applying pressure or vacuum medium to the different chambers 14a . . . n.

The coaxial scavenging jet is applied from scavenging connection 12 through scavenging nozzle 22. To obtain a higher scavenging efficiency, it is possible to use a higher scavenging pressure, but the diameter of this jet is appropriately made relatively small, so that on the one hand there is a cleaner entry of the coaxial scavenging jet into the erosion zone clearance and on the other hand there is not an excessively high scavenging fluid consumption. The greater this scavenging jet, hereinafter called the coaxial jet, is accelerated by the use of increased scavenging pressure, the greater the risk of lateral deflections and vacuum production when the scavenging jet strikes the workpiece 2. Thus, through scavenging connection 13 and the annular chamber 23 arranged in the scavenging nozzle 21, the annular chamber 27 surrounding the coaxial scavenging nozzle 22 is filled with comparatively low pressure scavenging medium, so that the coaxial core scavenging jet passing out of the coaxial scavenging nozzle 22 is surrounded by a circumferential jet of the same scavenging medium. This makes it possible to complete prevent the drawing in of air, which leads to wire breaks and faulty discharges in the erosion zone. Further, the entry of this circumferential scavenging medium to the work clearance also ensures a better filling of the erosion zone and provides an action against outflow losses of scavenging fluid in the previously cut contour path.

Figure 3A:
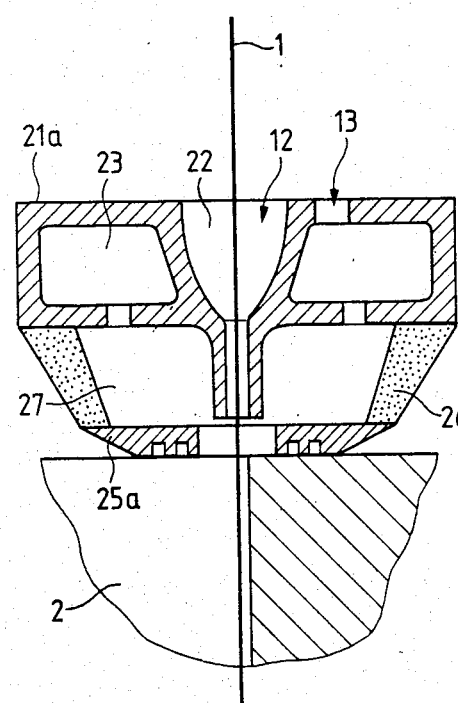
FIGS. 3a and b cross-sectional views of simplified embodiments of the present invention.

FIG. 3a show a simplified version of the scavenging system 20, in which the scavenging nozzle member 21a, apart from the coaxial scavenging nozzle 22, only has an annular chamber 23, which through the following annular chamber 27 forms the circumferential jet around the core scavenging jet. Slide ring 25a is connected by an annular sleeve 26a to said simplified scavenging nozzle member 21a. The drawing depicts an instantaneous cylindrical cutting position of wire electrode 1 and workpiece 2. As a result of the stiffness of annular sleeve 26a, the system can automatically ensure the engagement of slide ring 25 on workpiece 2. In the case where the workpiece is sloped, the slide ring is further urged into engagement with the workpiece by the progressively rising pressure forces with the conical construction of the annular sleeve 26a. The movement of slide ring 25 in accordance with the advance of the work can in this case result from the forces exerted by annular sleeve 26a instead of the coaxial scavenging nozzle 22, because sleeve 26a is advantageously constructed with a conical cross-section having a larger diameter than slide ring 25a.

Figure 3B:
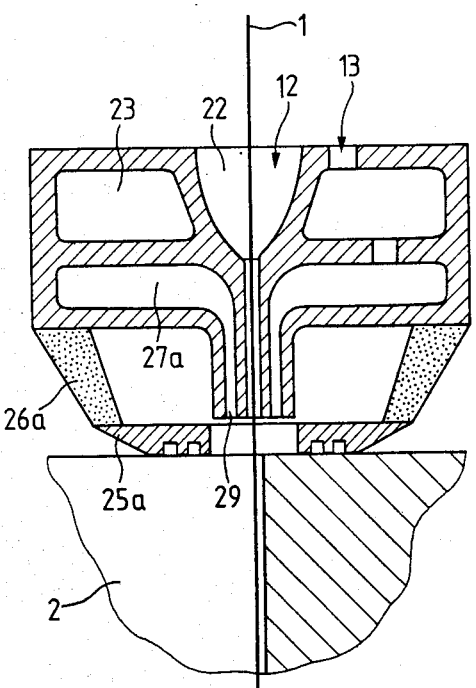

FIG. 3b shows a construction of scavenging system 20 which is simplified compared with FIG. 3a, in that annular chamber 27a is shaped into a circumferential scavenging nozzle 29 arranged coaxially around the coaxial scavenging nozzle 22. Such a circumferential scavenging nozzle arrangement can also be realized in conjunction with the apparatus according to FIG. 2.

A problem in spark-erosive working, which was briefly referenced in connection with the description of FIG. 2, consists of the outflow losses of the scavenging fluid from the cutting gap backwards into the zone already cut by wire electrode 1. If there is a coaxial scavenging flow from the bottom and top of the workpiece 2, the scavenging flows meet one another within workpiece 2 and, particularly in the case of diagonal cuts, are reciprocally rearwardly ejected, resulting in a strong flow acceleration and vacuum conditions.

Figure 4A:
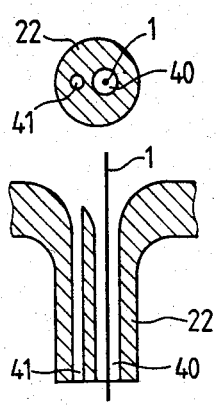
FIGS. 4a, b and c embodiments of nozzle outlets for the main scavenging jet, with modifications to compensate for the flow losses in the previously cut erosion zone.
Figure 4B:
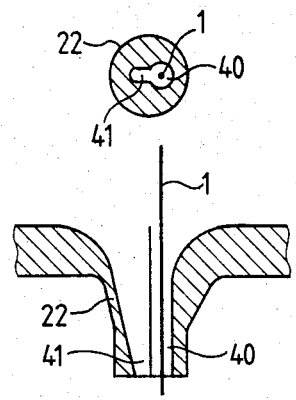
Figure 4C:
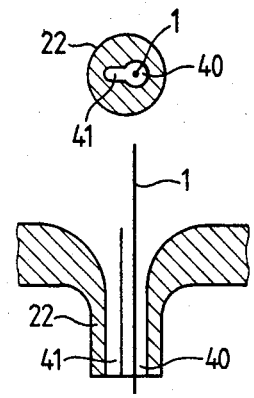
Figure 5:
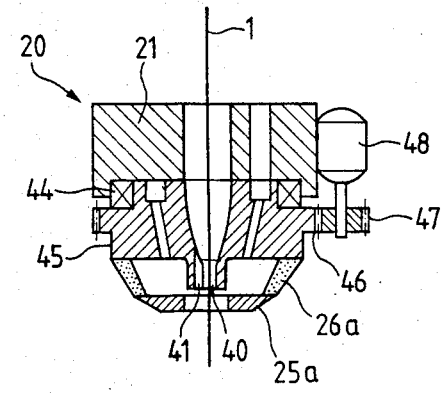
FIG. 5 a cross-sectional view of one embodiment of the present invention using a nozzle outlet as in FIG. 4 and having a rotatable scavenging system.

Embodiments of the solution to this problem are described relative to FIGS. 4 and 5. The core scavenging nozzle 22 forming the coaxial scavenging jet is not exclusively shaped in a circular manner, but is instead shaped in such a way that the already traversed cutting gap in the workpiece is to a greater extent filled with scavenging medium.

FIG. 4a shows on the cross-sectional representation of the outlet of coaxial scavenging nozzle 22, the centrally positioned scavenging channel 40 around wire electrode 1, with a further pressure scavenging bore 41 displaced thereto and which is axially parallel to the coaxial scavenging bore 40.

FIGS. 4b and 4c show two further coaxial scavenging nozzle constructions in which the additional pressure scavenging bore 41 is connected by a slot to scavenging channel 40. In the case of FIG. 4b, the slot is tapered and narrows toward the outlet of the nozzle, whereas in the case of FIG. 4c the slot is parallel to the coaxial scavenging jet 40.

So that the additional scavenging jet always reaches the gap in workpiece 2 that has been cut by wire electrode 1, the nozzle outlet is always turned in such a way in consideration of the instantaneous cutting direction, that the pressure scavenging bore 41 is positioned directly behind the erosion zone. According to FIG. 5, for this purpose the scavenging system 20 in the scavenging nozzle member 21 is constructed in two parts. By means of a mounting support 44, a rotary casing part 45 is flanged and can receive all scavenging channel connections by means of sealed annular ducts. The rotary casing part 45 is externally provided with a tooth system, which can be driven by a pinion 47 on the shaft of a motor 48. In the represented construction, the slide ring 25a is connected by means of an annular sleeve 26a in accordance with the simplified version of FIG. 3. Motor 48 is controlled in such a way that the rotary casing part 45, and with it the additional scavenging jet 41, is always above the gap just cut by wire electrode 1. the control signals can be derived from a numerical control, which is provided.

Figure 6:
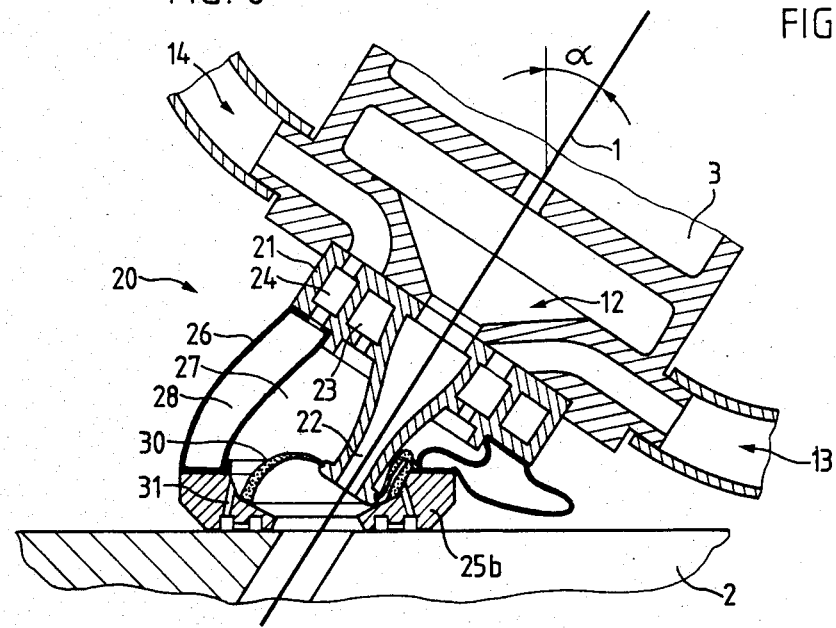
FIG. 6 a cross-sectional view of one embodiment of the present invention in which the main scavenging jet is isolated.

FIG. 6 shows another construction of the scavenging system 20, which is similar to that of FIG. 2. However, slide ring 25b is not supported on the coaxial scavenging nozzle 22 and is instead held in non-positive manner by it using a further sleeve ring 30. Thus, slide ring 25b has a bore connection 31 to the front annular groove of annular chamber 27, and through this the supply medium from the scavenging connection 13 is forced into the bearing surface between the slide ring 25b and the workpiece 2. The scavenging medium thus introduced as a seal against air and also partly enters the previously cut erosion zone. However, it preferably serves to improve the sliding characteristics of the guide ring 25b on the surface of the workpiece 2. In this embodiment and with corresponding constriction of the flows in bores 31 in slide ring 25b, annular sleeve 26 can also be constructed without chambers 28, because it is now possible to control the pressure by means of the scavenging connection 13 and the outflow effects of bores 31 in the annular chamber 27.

In place of the aforementioned flexible diaphragm it is also possible to use tension and/or compression springs in conjunction with simple diaphragm materials. The wire guide head 3 equipped with scavenging system 20 is preferably arranged in a pair, on the top and bottom of the workpiece 2. They can both be used as a pressure system, as an injection system, or as a suction system as required. The control of the pressure level and the quantities of scavenging fluid at scavenging connections 12, 13, 14 can be varied according to known methods. The scavenging medium can be a liquid, but gases or air can be used for filling chambers in the flexible annular sleeves 26. If the pressure level for the circumferential scavenging jet is controlled in annular chamber 27, it can automatically be ensured that the flexible annular sleeve 26 always bulges out with respect to the workpiece on the acute-angled side of the air inlet, so that there is no interference with the contact of coaxial scavenging nozzle 22 on slide ring 25.

What is claimed is:

1. In a spark-erosive cutting plant having a wire or strip-like tool electrode and tool electrode guide means arranged above and below a workpiece to be machined for guiding the tool electrode through the workpiece and controllable for optionally setting the tool electrode at an angle relative to the workpiece during machining, an erosion zone being formed between the tool electrode and the workpiece, an apparatus for scavenging the erosion zone with a fluid scavenging medium during the spark-erosive machining of the workpiece comprising: a scavenging chamber located on at least one side of the workpiece and formed as a deformable annular sleeve surrounding the tool electrode, the scavenging chamber being operatively connected at one end to the tool electrode guide means by a substantially fluid tight seal; and a circumferential slide ring means attached to the other end of the scavenging chamber and adapted to slideably seal against the workpiece surface around the tool electrode; the scavenging chamber further comprising wall means for adapting the scavenging chamber to the position of the slide ring means on the workpiece surface during machining.

2. An apparatus according to claim 1, wherein the wall means of the scavenging chamber is controllable to shape the scavenging chamber.

3. An apparatus according to claim 2, wherein the controllable wall means includes a supply line connected to a scavenging medium circuit.

4. An apparatus according to claim 1, wherein the wall means of the scavenging chamber comprises annular, expandable chambers.

5. An apparatus according to claim 1, wherein the wall means of the scavenging chamber comprises a plurality of expandable individual chambers spaced around the periphery of the scavenging chamber, the individual chambers including pressure medium supply means and being selectively expandable in accordance with the supply of pressure medium from the pressure medium supply means.

6. An apparatus according to claim 1, wherein the surface of the slide ring means facing the workpiece is provided with at least one substantially annular groove.

7. An apparatus according to claim 6, wherein at least one of the grooves is connected by a supply means to a scavenging medium circuit.

8. An apparatus according to claim 1, further comrpising means for shaping the flow of scavenging medium supplied to the erosion zone.

9. An apparatus according to claim 8, wherein the flow shaping means is adapted to supply a greater quantity of scavenging medium to vacant zones in the workpiece adjacent to the erosion zone.

10. In a spark-erosive cutting plant having a wire or strip-like tool electrode and tool electrode guide means arranged above and below a workpiece to be machined for guiding the tool electrode through the workpiece and controllable for optionally setting the tool electrode at an angle relative to the workpiece during machining, an erosion zone being formed between the tool electrode and the workpiece, an apparatus for scavenging the erosion zone with a fluid scavenging medium during the spark-erosive machining of the workpiece comprising: a deformable, sleeve-like scavenging chamber operatively connected to at least one of the tool electrode guide means by a substantially fluid tight seal and surrounding the tool electrode between the guide means and the workpiece surface; a substantially circular slide ring means attached to the scavenging chamber and adapted to slideably seal against the workpiece surface surrounding the tool electrode; and a scavenging nozzle surrounding the tool electrode and located within the scavenging chamber for discharging a scavenging medium jet toward the erosion zone surrounding the tool electrode, the scavenging nozzle being fixed with respect to the guide means and acting on the slide ring means to assist in moving the slide ring means along the workpiece surface during machining to prevent interference with the tool electrode.

11. An apparatus according to claim 10, wherein the slide ring means includes a substantially circular open inner portion through which the tool electrode passes and the outlet of the scavenging nozzle is located in the proximity of the inner portion of the slide ring means for contacting engagement.

12. An apparatus according to claim 10, wherein the scavenging chamber includes an interior annular chamber surrounding the scavenging nozzle and open toward the workpiece, and means for supplying scavenging medium to the interior annular chamber for discharge alongside the tool electrode and the scavenging medium jet provided by the scavenging nozzle.

13. An apparatus according to claim 10, further comprising means for shaping the flow of scavenging medium supplied to the erosion zone.

14. An apparatus according to claim 13, wherein the flow shaping means comprises the scavenging nozzle having a shaped nozzle outlet.

15. An apparatus according to claim 13, wherein the flow shaping means is rotatable with respect to the axis of the tool electrode.

16. An apparatus according to claim 15, further comprising drive means for rotating the flow shaping means in accordance with a programmed path to be cut in the workpiece so that a greater quantity of scavenging medium is supplied to cut channels in the workpiece adjacent the erosion zone.

* * * * *